No. 660,600. Patented Oct. 30, 1900.
A. TAPLIN.
FERTILIZER DISTRIBUTER.
(Application filed July 28, 1900.)

(No Model.) 2 Sheets—Sheet 1.

Witnesses
B. C. Woodford.
P. J. Egan

Inventor
Alvin Taplin.
By James Shepard
Atty.

No. 660,600. Patented Oct. 30, 1900.
A. TAPLIN.
FERTILIZER DISTRIBUTER.
(Application filed July 28, 1900.)
(No Model.) 2 Sheets—Sheet 2.
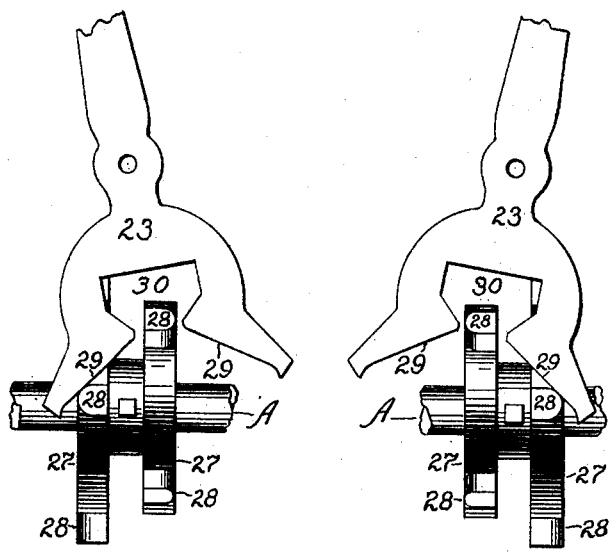
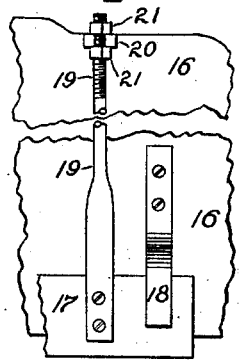
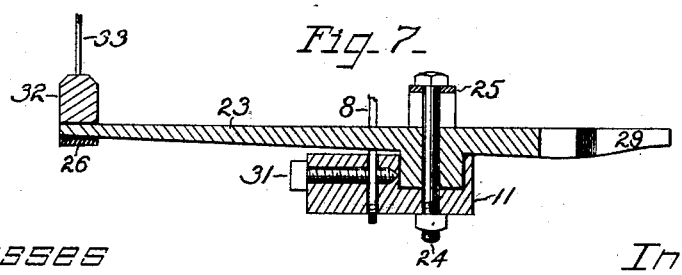
Witnesses
B. C. Woodford.
P. J. Egan
Inventor
Alvin Taplin.
By James Shepard.
Atty.

UNITED STATES PATENT OFFICE.

ALVIN TAPLIN, OF FORESTVILLE, CONNECTICUT.

FERTILIZER-DISTRIBUTER.

SPECIFICATION forming part of Letters Patent No. 660,600, dated October 30, 1900.

Application filed July 28, 1900. Serial No. 25,180. (No model.)

*To all whom it may concern:*

Be it known that I, ALVIN TAPLIN, a citizen of the United States, residing at Forestville, in the county of Hartford and State of Connecticut, have invented certain new and useful Improvements in Fertilizer-Distributers, of which the following is a specification.

My invention relates to improvements in fertilizer-distributers; and the objects of my improvements are simplicity and economy in construction and efficiency and convenience in operation.

Figure 1:
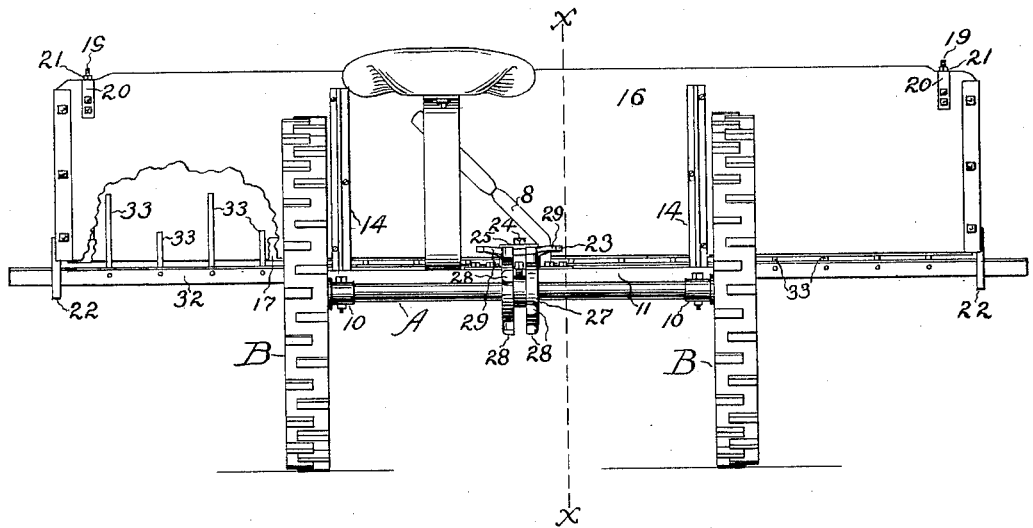
Figure 2:
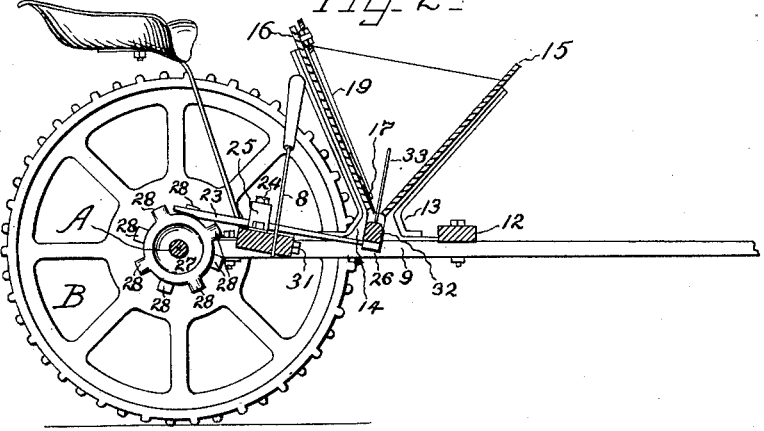
Figure 3:
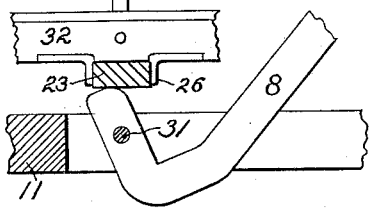

In the accompanying drawings, Figure 1 is a rear elevation of my machine with a portion broken away. Fig. 2 is a sectional side elevation on the line $x\ x$ of Fig. 1. Fig. 3 is an enlarged detailed sectional view of agitator-lever and connected parts, the plane of section being by the left-hand side of the lifting-lever 8, Fig. 2. Figs. 4 and 5 are plan views of a portion of the agitator-lever and its agitator-wheel. Fig. 6 is a detached side view showing the inner side of the rear wall of the hopper. Fig. 7 is a central longitudinal section of the agitator-lever and connected parts.

A designates the shaft or axle upon which one of the driving-wheels B B is rigidly mounted, so as to rotate the axle as the machine is drawn along over the ground. To this axle a suitable frame is attached in any proper manner. The said frame, as shown, consists of two side bars 9, secured by their rear ends to the axles by means of straps 10, the said side bars being connected by cross-bars 11 and 12. As shown, the said side bars are extended forwardly and form the shafts between which a horse may be hitched for drawing the machine. Upon the side bars I secure two pairs of brackets, of which the front brackets 13 slant forwardly a little more than the rear brackets 14, as shown in Fig. 2. Upon these brackets I mount the front and rear walls 15 and 16 of the V-shaped hopper and provide them with suitable end pieces to close the ends of the hopper. The front and rear hopper walls or boards do not quite meet each other, so that a continuous slot is left at the bottom of the hopper for its whole length. The hopper is long and extends transversely for distributing fertilizer broadcast, the continuous slot extending from end to end of the hopper. The rear wall of the hopper does not come down quite so far as the front wall, thus leaving the slot fully as wide as will ever be required. I regulate the width of this continuous slot by means of a gate 17, that lies flatly upon the inner side of the rear wall 16, where it may be held down by means of a strap or guide 18, secured thereto, as shown in Fig. 6, there being three of said straps or guides in the length of the hopper. I also provide the said gate with two adjusting-rods 19, the same being screw-threaded at their upper ends and passing loosely through lugs 20, mounted near the upper edge of the wall or board 16. Stop-nuts 21 on opposite sides of the lugs 20 enable me to adjust the rods 19, and consequently the gate 17, so as to open or close the continuous slot at the lower part of the hopper, as may be desired. Underneath this slot in the hopper and extending lengthwise therewith is the agitator-bar 32, which is supported in the bearings or guides 22, so as to slide freely longitudinally. Projecting from the top of this bar are the agitator-pins 33, which extend through the slot in the bottom up into said hopper, as shown in Figs. 1 and 2. I prefer to use long and short pins alternating each other, as shown.

Upon the upper side of the cross-bar 11 I pivot the agitator-lever 23 upon the bolt 24, the upper end of which bolt is supported in a bridge 25, so that the said agitator-lever may be raised and lowered on its pivot as well as vibrated thereon. The front end of the agitator-lever extends into a loop or socket 26 on the under side of the agitator-bar 32, so that the vibratory motion of the said lever imparts a longitudinal reciprocating movement to the agitator-bar.

Upon the axle, rigidly mounted, so as to rotate therewith, are the agitator-wheels 27, or what may be called a "double wheel," inasmuch as the said two wheels have a common hub. Each member is provided with four radial lugs 28, rounded on their outer sides and straight on the inside, as shown. The lugs on the two wheels or two members are so arranged that each lug is directly opposite the middle point between two lugs of the opposite member of the said wheel. The rear end of the agitator-lever is bifurcated and provided with two oppositely-inclined pallets 29 and clearing-space 30, Figs. 4 and 5, the inclined faces of the said pallets extending longitudinally of the lever for being acted upon by the said agitator-wheel, something after the manner of an escapement, as will be readily understood by an examination of Figs. 4 and 5. Fig. 4 shows the lever just after it has been thrown in one direction and ready to be thrown in the opposite direction by engagement with the right-hand member of the agitator-wheel, the lever being arranged tangentially to the said wheel and the top of said wheel moving toward the pallets on the agitator-lever. Fig. 5 shows the agitating-lever, whereby the force of the said lugs is exerted mainly in the endwise direction of the said lever instead of transversely to its length at right angles to its broad sides, in the position it has been left in when acted upon by the right-hand member of the wheel and just ready to be acted upon by the left-hand member.

In order that the agitator-lever may be thrown entirely out of action and the bottom of the hopper closed, so that the machine may be driven from place to place without operating the agitator and without losing the fertilizer, I arrange the lifting-lever 8 in a slot within the cross-piece 11, the said lever being pivoted on the bolt 31 and arranged to lift the agitator-lever bodily on its pivot, so as not only to carry the agitator-lever out of action, but also so as to raise the agitator-bar closely up to the slot in the bottom of the hopper to close the same. Figs. 3 and 7 show detached views of the lifting and agitator levers in connection with the agitator-bar, Fig. 3 showing the agitator lever and bar as partly lifted. When the lifting-lever has been thrown still farther to carry its end a little past the dead-center, it will hold the agitator bar and lever in their elevated position.

It is apparent that some changes from the specific construction herein disclosed may be made, and therefore I do not wish to be understood as limiting myself to the precise form of construction shown and described, but desire the liberty to make such changes in working my invention as may fairly come within the spirit and scope of the same.

I am aware that prior patents show forked agitator levers and wheels, with the said levers arranged substantially radial to the wheel and with the wheel provided with side-acting cams that bear upon the lever transversely to its length and at right angles to its broad sides, and I hereby disclaim the same.

I claim as my invention—

1. The combination of the hopper having the continuous longitudinal slot at its bottom, with the agitator-bar underneath said slot, the lifting-lever 8, operatively connected with the said agitator-bar, whereby the said bar may be readily lifted by means of the said lever to raise the bar into a position for closing the slot in the bottom of the hopper when desired, substantially as described.

2. In a fertilizer-distributer, the combination of a double agitator-wheel both members of which are provided with radial lugs, with the agitator-lever having opposing pallets inclined in the longitudinal direction of the said lever, the said lever being mounted tangentially to the said wheel whereby the said radial lugs act on the inclined pallets in the longitudinal direction of the said lever, the agitator connected with the said lever, and the hopper within which the agitator is mounted, substantially as described.

3. The combination of the agitator wheel and lever with the pivotal bolt and bridge 25 for the said lever whereby the said lever may oscillate on said bolt and also move longitudinally thereto, and the lifting-lever 8 for raising the said lever out of action with the said wheel when desired, substantially as described.

4. The combination of the agitator wheel and lever, with the pivotal bolt for said lever upon which it is mounted to oscillate and for moving longitudinally to said bolt, the hopper having a slot at the bottom, the agitator-bar underneath the said hopper and connected by one end with the said agitator-lever, and means for lifting the said agitator lever and bar for throwing the agitator out of operation and closing the slot at the bottom of the hopper, substantially as described.

ALVIN TAPLIN.

Witnesses:
JAMES SHEPARD,
B. C. WOODFORD.